United States Patent [19]

Keizer

[11] 3,880,803

[45] Apr. 29, 1975

[54] PROCESS FOR STABILIZING POLYMERS

[75] Inventor: Sietske Keizer, Groningen, Netherlands

[73] Assignee: Stamicarbon, B.V., Geleen, Netherlands

[22] Filed: Dec. 11, 1972

[21] Appl. No.: 313,636

[30] Foreign Application Priority Data
Dec. 10, 1971 Netherlands.................... 7116953

[52] U.S. Cl....260/45.85 R; 260/45.7 R; 260/45.7 P; 260/45.7 S; 260/45.85 R; 260/45.85 H; 260/45.95 G; 260/45.95 R; 260/45.95 D; 260/45.95 C; 260/45.9 QB
[51] Int. Cl. .................... C08f 45/58; C08g 51/58
[58] Field of Search............. 260/45.7, 45.8, 45.85, 260/45.9, 45.95, 45.75, 23 XA; 117/106 R, 132 C

[56] References Cited
UNITED STATES PATENTS

| | | | |
|---|---|---|---|
| 3,149,093 | 9/1964 | Hecker et al. | 260/45.75 |
| 3,396,130 | 8/1968 | Leistner et al. | 260/23 |
| 3,504,012 | 3/1970 | Braus et al. | 260/45.85 |
| 3,546,270 | 12/1970 | Kirchmayr et al. | 260/45.85 |
| 3,640,747 | 2/1972 | Richart | 117/132 |
| 3,676,172 | 7/1972 | Van Dyk et al. | 117/132 |

*Primary Examiner*—V. P. Hoke
*Attorney, Agent, or Firm*—Cushman, Darby & Cushman

[57] ABSTRACT

A process for stabilizing conventional particulate thermoplastic organic polymers by admixing conventional stabilizers for the polymers is disclosed, wherein the resulting polymer-stabilizing mixture is homogeneous and exhibits good polymer stability. The stabilizer has a melting point at least 1° C less than the temperature at which the polymer agglomerates and/or sinters and/or decomposes. The stabilizer is in the non-liquid state and preferably has a viscosity of at least 50 poise, measured under the conditions at which the stabilizer is added to the polymer. The polymer is heated to a temperature above the melting point of the stabilizer, and lower than the agglomeration and/or decomposition and/or sintering temperature of the polymer. The stabilizer is admixed with the polymer while the polymer is maintained at about the aforesaid temperature, and while the stabilizer is at a temperature at least about 1° C lower than the stabilizer melting point temperature. The mixing is preferably at a shear rate no greater than 1000 sec$^{-1}$.

The resulting polymers may be used in conventional applications for such polymers, and will exhibit improved stability against heat, light and/or oxygen.

20 Claims, 2 Drawing Figures

3,880,803

PROCESS FOR STABILIZING POLYMERS

BACKGROUND OF THE INVENTION

The prior art has stabilized granular, fibrous or powdery polymers for a long time by mixing one or more stabilizers with the polymers. The stabilizers have been added to the polymers in the form of solutions or suspensions in a distributing agent with intensive stirring of the mixture of polymer and stabilizer. The distributing agent is then removed by evaporation, leaving the stabilizers behind in the form of a thin skin on the polymer particles. German Offenlegungschrift 1,916,267 teaches that the resulting mixture should then be subjected to high shearing forces, for example, with the aid of a roll or an extruder. This method of incorporating stabilizers into polymers has disadvantages in that the distributing agent must be evaporated or otherwise removed from the mixture of polymer and stabilizer, which requires extra time and energy, and may result in atmospheric pollution. The mixture of polymer and stabilizer must be subjected to a high shearing force to achieve a completely homogeneous distribution of the stabilizer in the polymer, and this approach requires a high consumption of energy.

Belgian patent specification No. 618,292 teaches that it is possible to mix a dry stabilizer with the particulate polymer, and then the mixture is mechanically processed at elevated temperatures, for example, by grinding at a temperature above 100°C, by extrusion or by mixing in a Banbury mixer at temperatures of, e.g., 150°–170°C. For a completely homogeneous distribution of the stabilizer in the polymer, it is necessary in this process for the mixture to be homogenized by being melted during the granulation or the rolling step, note, e.g. J. Voigt; Die Stabilisierung der Kunststoffe gegen Licht und Warme; 1966, page 398.

DESCRIPTION OF THE INVENTION

The present invention, in contrast to the prior processes acknowledged above, provides a process for mixing polymers with stabilizers therefor in a manner which is simpler and more economical than prior techniques and also yields excellent results in terms of stability of the resulting stabilized polymer and objects prepared therefrom. It is unnecessary for the stabilizer to be separately kneaded in the polymer in order to produce a product which is stable during storage and during subsequent polymer processing steps such as, for example, extrusion, injection molding an sintering.

One or more stabilizers are mixed in the non-liquid state with one or more particulate polymers while the polymers are at a temperature above the melting temperature of the stabilizers and lower than the temperature at which the polymer particles agglomerate, sinter or decompose. The polymers and stabilizers are mixed together preferably under low shear conditions.

This relatively simple process unexpectedly not only achieves excellent mixing, but the resulting mixture is so homogeneous as to produce a resulting polymer stability which is at least equal, and in many instances better than, that obtained by the aforesaid conventional methods wherein the stabilizer, in the form of a solution or suspension in a distributing agent, is mixed with the polymer and the whole mixture is then kneaded, or in which the dry stabilizer is mixed with a particulate polymer at low temperatures and then the entire mixture is mechanically processed at elevated temperatures. The powdery, fibrous or granular polymers stabilized according to the present invention have excellent stability, as do objects made from the stabilized polymers. The particulate polymers are stable during storage against oxidation, light, and/or the like, and the stabilized polymer possesses good initial stability during molten processing steps, wherein the polymer may be kneaded or molten. It has been unexpectedly found that the addition of stabilizers in the non-liquid state to the polymers produces substantially better stability then can be obtained by the addition of stabilizers in the liquid state to the polymers.

Particulate thermoplastic organic polymers or mixtures of such polymers are stabilized by admixing with the polymer one or more stabilizers for stabilizing the polymer against the effects of heat, light, oxygen or the like. The stabilizer is chosen so as to have a melting point at least 1°C, preferably 5°C, less than the temperature at which the polymer agglomerates, decomposes or sinters. The stabilizer is in the non-liquid state and preferably has a viscosity of at least 50 poise, measured under the conditions at which the stabilizer is added to the polymer. The polymer is heated to a temperature above the melting point of the stabilizer and lower than the agglomeration, decomposition and/or sintering temperature of the polymer. While the polymer is maintained at the elevated temperature, the stabilizer, which is at a temperature at least about 1°C below the stabilizing melting point temperature, is admixed therewith, preferably with the mixing at a shear rate no greater than 1000 sec$^{-1}$.

Any particulate thermoplastic organic polymer can be stabilized according to the process of the present invention, provided it is in particulate form, e.g., powdery, fibrous or granular form, and provided that the polymer may be heated to a temperature above the melting point of the stabilizers without agglomerating, sintering, or decomposing the polymer. It is generally preferred to use polymers having an average particle size of about 10 $\mu$ to 5 mm, preferably less than 2 mm.

The polymers which are stabilized according to the present invention may be obtained of the known polymerization processes, including mass polymerization, gas phase polymerization, solution polymerization, suspension polymerization, and emulsion polymerization. Also, the polymers can be obtained by using combinations of known polymerization processes, such as mass polymerization followed by suspension polymerization, or a suspension polymerization followed by a gas phase polymerization.

Examples of thermoplastic organic polymers which can be stabilized by the process of the present invention include olefin polymers and copolymers, such as, for instance, polyethylene, polypropylene, polybutylene, poly-4-methylpentene-1, ethylenepropylene copolymers, ethylenebutylene copolymers and ethylenevinyl copolymers. The olefin polymers and copolymers will generally contain at least 70 mole percent of units derived from at least one olefin having 2–10 carbon atoms, preferbaly 2–6 carbon atoms, and most preferably 2 or 3 carbon atoms. Vinyl polymers and copolymers can also be stabilized according to the process of the present invention, including polyvinylchloride, polyvinylidenechloride, polystyrene, poly-α-methyl styrene, polymethylmethacrylate, polymethylacrylate, polyacrylonitrile, polymethacrylonitrile, styrene-acrylonitrile copolymers, acrylonitrilebutadienerubber-styrene-resin (ABS), acrylonitrile-styrene-acrylaterubber copolymers (ASA), methylmethacrylate-butadienerubber-styrene copolymers (MBS), methylmethacrylate-acrylonitrile-butadienerubber-styrene copolymers (MABS) and the like. In addition, polyamides such as Nylon 6, Nylon 66, and the like, polyesters, such as polyethylene terephthalate and the like, polyoxymethylenes, polycarbonates, and all other thermoplastic organic polymers may be stabilized according to the process of the present invention.

By preference, the process according to the invention is used in the stabilization of polymers having a porous structure.

The stabilizers must be in the non-liquid form, which means that the stabilizers are essentially not free flowing at the temperature at which the stabilizers are added to the polymer. Such non-liquid stabilizers preferably have a viscosity of at least 50 poise, most preferably a viscosity in excess of 100 poise, which means that the stabilizers will be solid, pasty or waxy.

Any of the conventional stabilizers which are known to the art as suitable for the particular polymer or polymers used may be utilized in the process of the present invention, provided such stabilizers are in the non-liquid form under the conditions at which the stabilizers are added to the polymer, and a melting point at least 1°C, preferably 5°C, less than the temperature in which the polymer agglomerates, decomposes or sinters. Of course, the particular stabilizer must be chosen with regard to the particular polymer or polymers which are to be stabilized. Depending upon the particular polymer used, suitable stabilizers include (a) substituted phenols and bis-phenols wherein the phenolic ring may be substituted by at least one radical selected from the group consisting of hydroxyl and alkyl of 1–6 carbon atoms, such as, for instance, 2,6-di-tertiary butyl-4-methyl phenol, 2,5-di-tertiary butyl hydroquinone, 2,2'-methylene bis-(4 methyl-6-tertiary butylphenol), 4,4'-methylene bis-(2-methyl-6-tertiary butylphenol), 2,2'-methylene bis-(4-ethyl-6-tertiary butylphenol), (b) alcohols and polyhydroxy compounds containing from 3 to 6 carbon atoms and from 3 to 6 hydroxyl groups, especially polyhydroxy alkenols having the indicated number of carbon atoms and hydroxyl groups, such as sorbitol and the like, (c) ethers, especially phenolic ethers and bis phenolic ethers, wherein the phenolic ring can be substituted with hydroxyl radicals, alkyl radicals of 1–6 carbon atoms, and benzyl radicals, which in turn may be substituted by hydroxyl groups, alkoxy groups and alkyl groups of 1–6 carbon atoms, such as, for instance, tertiary butyl hydroxyanisol, hydroquinone monobenzylether, 2,2'-bis-(4-alkyl-6-alkoxyphenol), 4,4'-bis-(2-alkyl-6-alkoxyphenol), and 2,6-di(2'-hydroxy-3'-tertiary-butyl-5'-methylbenzyl)-4-methyl-phenyl-methylether, (d) carboxylic acid esters of aliphatic and aromatic acids which can be substituted containing from 6 to 20 carbon atoms, wherein the ester radical is alkyl of 4–20 carbon atoms or a phenyl which may be substituted by at least one hydroxyl radical or alkyl radical of 1–12 carbon atoms, especially esters of (hydroxy)benzoic acid, including, for instance, β(3,5-di-tertiary-butyl-4-hydroxy-phenyl)-propionic acid-n-octadecylester, resorcinmonobenzoate, 4-tertiary butylphenylsalicylate, and 4-octyl-phenylsalicylate, (e) aromatic keto compounds of the formula

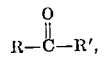

wherein R and R' are independently aryl radicals, which may be substituted by at least one hydroxyl radical, carboxyl radical, halogen atom, alkyl group of 1–6 carbon atoms, alkoxy group of 1–10 carbon atoms, and the corresponding diketo compounds, especially triphenyl diketones, wherein the phenyl rings may be substituted by at least one of the above substituents such as, for instance, 2-hydroxy-5-chlorobenzophenone, 2-hydroxy-4-methoxybenzophenone, 2,2'-dihydroxy-4-n-octyloxybenzophenone, and 2,4-dibenzoyl resorcin, (f) aromatic amines and diamines, especially secondary amines and diamines containing at least one phenyl or naphthyl radical, and a second substituent on the nitrogen atom which may be a phenyl radical, a napthyl radical, or an alkyl group of 1–10 carbon atoms, such as, for instance, phenyl-1-napthylamine, phenyl-2-napthylamine and N,N'-di-2-octyl-p-phenyldiamine, (g) aryl phosphoric compounds, especially aryl phosphites, and most especially tri-aryl phosphite, wherein one or more phenyl radicals may be substituted by a hydroxyl radical, an alkyl radical of 1–12 carbon atoms, and the like, such as triphenyl phosphite, and (h) aliphatic and aromatic sulphur containing organic compounds, especially thio ethers and mercapto compounds, preferably sulphur containing compounds wherein the sulphur atom or atoms carries two substituents, with each substituent independently selected from the group consisting of phenyl radicals, which may be substituted by at least one hydroxyl radical or alkyl radical of 1–6 carbon atoms, propionate radicals, and alkyl of 1–20 carbon atoms, and the like, such as, for instance 2,2'-thio-bis-(4-methyl-6-tertiary butylphenol), 4,4'-thio-bis-(2-methyl-6-tertiary butylphenol), dilauryl thiodipropionate, and distearyl thiodipropionate.

Generally, the stabilizers will be used in an amount of no more than 10% by weight, based on the weight of the polymer. Preferably, the stabilizers will be used in an amount of between 0.001 and 5% by weight, based on the weight of the polymer. Of course, enough stabilizer must be used to achieve a stabilizing effect for the given polymer-stabilizer system. The process of the present invention will normally be conducted at atmospheric pressure, although higher or lower pressures may be used as desired, with equally good results.

It is critical that the stabilizers are admixed with the polymer while the stabilizers are in the non-liquid state. The addition to the polymers of stabilizers which are in the liquid state not only yields a poorer polymer stability than would be obtained with the addition of the stabilizer in the non-liquid state, but also involves much longer mixing times in order to achieve visually comparable mixing (mixing to the stage where no lumps or agglomerates can be observed). However, in spite of these longer mixing times, particle size enlargement invariably occurs with the addition of stabilizers in the liquid state because agglomeration cannot be completely avoided.

The temperature of the polymer must be higher than the melting temperature of the stabilizer or stabilizers used and lower than the sintering, decomposition or agglomeration temperature of the polymer. Preferably, the polymer temperature will be between 0.1° and 100°C higher than the melting point of the stabilizer or stabilizers, preferably between 1° and 60° higher than such melting point, and most preferably between 5° and 60° higher than the stabilizing melting point. When mixtures of stabilizers are used, the polymer temperature should be with reference to the melting point of the highest melting point stabilizer. Normally, the polymer temperature will be between 20°C and 200°C, depending upon the particular type of polymer. For polyethylene the polymer temperature cannot be much higher than about 120°C because polymer sintering or agglomeration occurs at about this temperature.

At the same time that the polymer particles are mixed with one or more stabilizers, including UV stabilizers, heat stabilizers and antioxidants, according to the process of the present invention, other substances may be added to the polymer. These other additives include antistatic agents, lubricants antiblocking agents, fire-retardant or flame-extinguishing agents, fillers, pigments, antigloss agents and plasticizers. These additives may be added to the polymer simultaneously with the stabilizer or during the mixing of the polymer stabilized. Care must be taken to insure that these added substances, if in the liquid state, do not interfere with the mixing of the polymer and stabilizer or stabilizers, and for this reason, it is particularly preferred to use liquid additives in amounts no greater than about 20% by weight, based on the weight of the polymer. Preferably, however, any such additives are in the solid state when added to the polymer-stabilizer mixture. These solid additives should have a melting point below the temperature at which the polymer agglomerates or sinters for the greatest ease in incorporation, although it is possible to use solids having melting points above such temperatures if limited quantities, in the order of at most 20% by weight, based on the weight of the polymer, are used. Preferably, the other additives will be used in amounts of less than 30% by weight, based on the weight of the polymer, if incorporated during the mixing of the polymer with the stabilizer.

It is also possible, if necessary, to deactivate the catalyst residues in the polymer during the step of mixing the polymer with the stabilizers. This may be particularly advantageous in the case of polyolefin polymers. The catalyst deactivation may be readily accomplished by contacting the polymers with gaseous alcohols, especially lower alkanols or water vapor. This may be readily accomplished, for instance, if the mixing is in a fluidized bed, by using the water vapors or gaseous alcohols as the mixed part of the fluidized medium. If methanol, for instance, is used as the catalyst deactivating agent, it will normally be used in an amount of 0.1–5 cm$^3$ per 100 g of polymer, although larger amounts can generally be used without an adverse effect.

The stabilizer and the particulate polymer may be mixed in various ways, wherein the entire mixture should be agitated, depending upon the effectiveness and rate of mixing. It is particularly preferred that the agitation be effected without subjecting the polymer particles to high shearing forces and shearing rates, which could result in a considerable raise of the polymer temperature. For this reason, preference is given to the use of mixing equipment wherein the polymer shearing rates are lower than about 1000 sec$^{-1}$, most preferably wherein such shearing rates are less than 500 sec$^{-1}$. A fluidized bed is excellently suited for this mixing operation, although other conventional equipment known to the art is also applicable, such as mixing drums and the like. It will be appreciated that the process of the present invention is conducted with the temperature of the polymer in excess of the melting temperature of the stabilizer and it is therefore necessary, as a general rule, in order to maintain the elevated temperature of the particulate polymer, to have heating means associated with the mixer, such as heating jackets or the like, or, in the case of a fluidized bed, the carrier gas itself may be heated.

The process of the present invention is of particularly great advantage for stabilizing polymers having high to very high molecular weights, that is, for instance for polyethylene above 100.000. It is known that these polymers can only be kneaded with great difficulty, sometimes only after significant thermal decomposition of the polymer, and the prior art has considered it of great importance to limit the kneading treatment as much as possible. In contrast, the present invention provides a method of preparing a high molecular weight polymer which is stabilized, and which may contain other additives, without subjecting the polymer to a kneading treatment.

As mentioned above, a strong preference is given to using mixing equipment using relatively low shearing rates of the polymer. This use of low shear rates reduces the polymer degradation during mixing, generally resulting in improved physical properties of the resulting stabilized polymer. In addition, the low shear mixing is generally much simpler to accomplish than is high shear mixing on, e.g. an extruder or the like. Thus not only is the stabilizer more homogeneously distributed in the polymer, but the polymer thus generally exhibits less process degradation and the process itself is normally simpler or less complicated.

DESCRIPTION OF THE DRAWINGS

To illustrate how the stabilizer is distributed over the polymer by the process of the present invention, a color reaction was utilized wherein coloration of the polymer occurred only where the stabilizer was present. Polyethylene powder, having an average particle size of about 400 microns, was stabilized according to the process of the present invention with a phenolic stabilizer, n-octadecyl-2-(4-hydroxy-3,5-di-t-butylphenyl)propionate, in an amount of 0.5% by weight, based on the weight of the polymer, with this amount of stabilizer being sufficiently large for analytical purposes. The stabilizer was applied to the polymer using the procedure of Example 1 below. The stabilized, powdery polyethylene was then sprayed with a solution of phosphormolybdic acid in ethanol (10 g per 100 ml). Excess phosphormolybdic acid was neutralized by ammonia. The portions of the polymer particles covered with stabilizer were indicated by the development of a blue color.

EXAMPLES OF THE INVENTION

Figure 1:
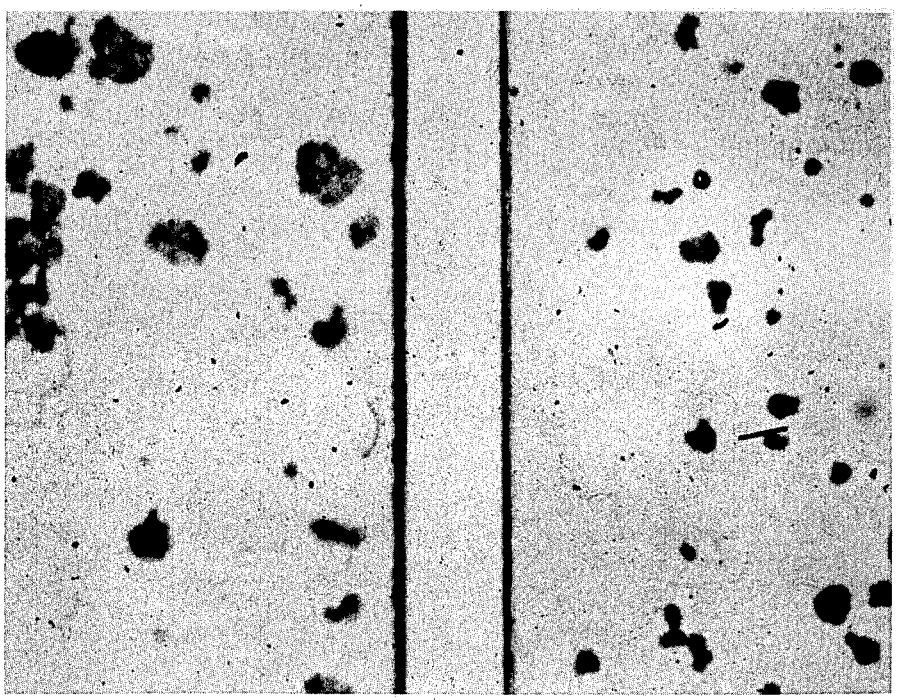
FIG. 1 of the accompanying drawings indicates the results of this test, wherein the right-hand photograph represents polymer particles produced as described above, according to the process of the present invention, with the polymers being fully colored, and therefore fully covered with the stabilizer. The photograph on the left is of identical material, except no stabilizer was used, and it will be noted that no color can be observed. From the above, it appears that the process of the present invention allows polymers to be obtained having an entire surface thereof covered with the stabilizer. Microscopic observations indicate that substantially the entire area of the surface of the particulate polymer particles is covered with stabilizer. In spite of the limitations wherein color development can only be demonstrated by differences in contrast, it is quite apparent that the stabilizer can be homogeneously distributed on the polymer by the process of the present invention.
Figure 2:
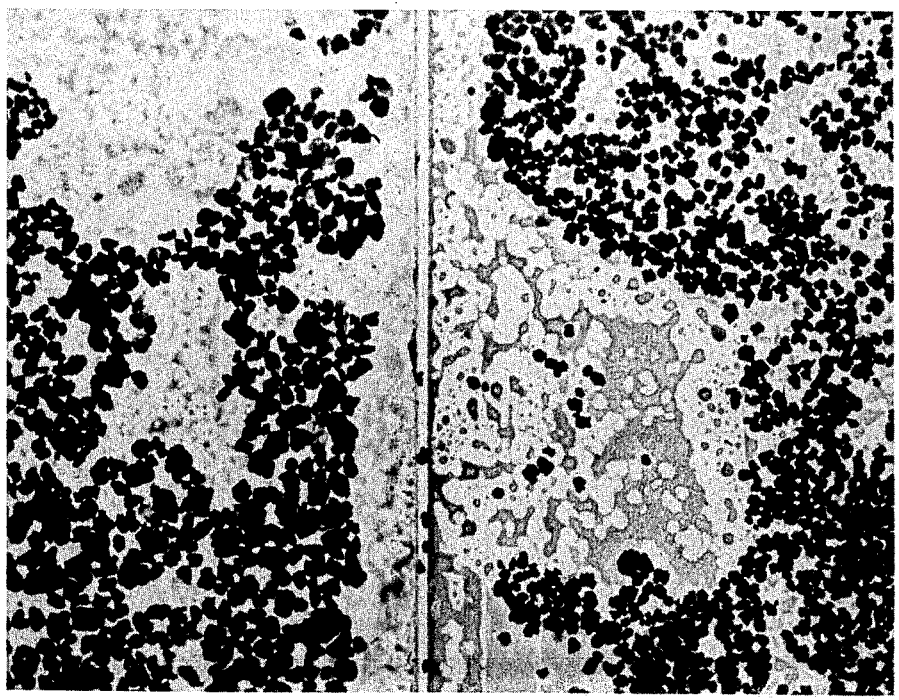
FIG. 2 of the accompanying drawings is a pair of photomicrographs which illustrate the adverse effect of adding the stabilizer in the liquid state (not according to the present invention). The photograph on the left is of the same polyethylene stabilized with the same phenolic stabilizer as used in the experiment represented in FIG. 1, except the phenolic stabilizer was in the melted or liquid condition when added to the polymer. The photograph on the right of FIG. 2 is of the same polymer without any stabilizer added thereto. The polymer stabilized with the liquid stabilizer clearly has a larger average particle size than the product which has not been stabilized. In spite of prolonged and intensive agitation, a certain degree of agglomeration could not be avoided.

The invention will be understood more readily by reference to the following examples; however, these examples are intended to illustrate the invention and are not to be construed to limit the scope of the invention.

In the following examples certain comparisons are presented between the stability of the polymers stabilized according to the process of the present invention and the same polymers stabilized according to the prior art methods. It is believed that one of the most accurate comparisons which can be made between such products for comparative purposes is the so-called oxyluminescence method.

The oxyluminescence method is based on the principle that the oxidation of a large number of organic compounds involves the emission of light, and use of this phenomenon has been made by measuring the light emission as a function of time during the oxidation of polymers. The polymers are normally oxidized by heating same in an oxygen-containing atmosphere. The polymer sample is considered oxidized only at that period in time when the oxyluminescence is noted, and the time interval between the start of the test and the moment the sample starts to oxyluminesce is designated the induction time. Naturally, the induction time will be longer for a product which has better stability. The oxyluminescence method is described in more detail in J. Sci. Inst. E2, 812–813 (1969 and in Fourth International Synthetic Rubber Symposium, Issue 2 (November 1969

In the following examples, melt indices are measured according to ASTM D-1238.

EXAMPLE 1

A polyethylene powder having an average particle size of about 300 microns was deactivated with methanol, dried at 80°C to remove the remaining methanol, and then divided into four fractions which were treated as follows:

SAMPLE A

This sample was not stabilized.

SAMPLE B

This sample was stabilized according to the prior art by adding a powdery stabilizer mixture consisting of 0.02% by weight of n-octadecyl-2-(4-hydroxy-3,5-di-t-butylphenyl)propionate and 0.02% by weight of di-laurylthio-dipropionate (melting point 55° to 60°C) to the polymer at room temperature (i.e., both the stabilizer mixture and the polymer were at room temperature). The resulting composition was mixed, the mixing subsequently continues on a roll at 160°C for about 10 minutes.

SAMPLE C

This sample was stabilized according to the prior art by adding the same stabilizer mixture in the same amounts as were used for Sample B above, except the stabilizer mixture was melted and heated to about 80°C prior to being added to the polymer, which was at room temperature. During and after the addition of the heated stabilizer, the resulting admixture was stirred until all lumps and agglomerates had disappeared.

SAMPLE D

This sample was stabilized according to the process of the present invention by heating the polyethylene powder to a temperature of 80°C and adding the same stabilizer mixture as was used for Sample B to the heated polymer, with the stabilizer mixture being at room temperature. Then the resulting admixture was stirred for the same amount of time as was used for Sample C, above.

All four samples were heated in a furnace to a temperature of 190°C and then the melt index (m.i.) for each sample was measured after holding the sample at that temperature for 7, 30, 60 and 120 minutes. The results of the melt index measurements are given in Table 1, below.

Table 1

|  | A | B | C | D |
|---|---|---|---|---|
|  | m.i. | m.i. | m.i. | m.i. |
| after 7 min | 0.25 | 0.26 | 0.26 | 0.26 |
| after 30 min | 0.26 | 0.22 | 0.21 | 0.25 |
| after 60 min | 0.20 | 0.25 | 0.20 | 0.26 |
| after 120 min | 0.18 | 0.22 | 0.24 | 0.25 |

An examination of Table 1 above indicates that the melt index of the non-stabilized product (Sample A) decreased during prolonged exposure to the 190°C temperature, i.e., thermal instability occurred giving rise to formation of linkages. The melt index of the product stabilized on the roll (Sample B) varied significantly, which, though to a lesser degree, was also noted for the liquid stabilized product (Sample C). Apparently two different thermal effects, i.e., linkage and decomposition, were alternately occurring. The linkage phenomenon is considered particularly undesirable as interfering with the processibility of the polymers, causing inhomogeneities to occur locally, which is highly undesirable in the preparation of films, cables, bottles and the like. The polymer stabilized according to the process of the present invention (Sample D) is clearly more stable than any of the other three fractions, particularly after longer periods of exposure.

EXAMPLE 2

Example 1 was repeated to obtain the four samples, A, B, C and D. The stability of these four samples was measured by the oxyluminescence method, subjecting the samples to an oxygen atmosphere at 150°C, with the results given in Table 2 below:

Table 2

|  | A | B | C | D |
|---|---|---|---|---|
| induction times in hours | 3 | 21 | 19 | 51 |
| duplicate | 3 | 31 | 21 | 56 |

The results set forth in Table 2 above show that the addition of the stabilizer in the liquid state (Sample C) produces induction times in the same order of magnitude as achieved by blending on the role (Sample B). The results also indicate that the stabilizing effects obtained by the process of the present invention (Sample D) are significantly improved over those obtained by the conventional roll-blending technique, and by the liquid stabilizer state technique.

EXAMPLE 3

In this example, three samples were compared, as follows:
SAMPLE A

This sample corresponded to Sample B of Example 1.
SAMPLE B

This sample corresponded to Sample C of Example 1.
SAMPLE C

This sample, in accordance with the process of the present invention, corresponded to Sample D of Example 1.

A rough sheet having dimensions of about 150 to about 250 mm was obtained for Sample A. The powders of Samples B and C were compressed at 250.000 psi pressure and at 160°C to form sheets of about 250—250 mm. From these sheets 9 sample plates of 10 × 10 mm were obtained for each sample by stamping the sheets along a diagonal line. These plates, of a thickness of 2 mm, were cut in half parallel to the major surface to produce plates having dimensions of 10 × 10 × 1 mm. The stability of these plates was determined by the oxyluminescence method, measuring the plates, with the cut-open sides directed upwards, for induction times in an oxygen atmosphere at a temperature of 150°C, with the results set forth in Table 3 below.

TABLE 3

| plate no. | (induction times in hours) | | |
|---|---|---|---|
|  | A | B | C |
| 1 | 22 | 28 | 90 |
| 2 | 22 | 56 | 87 |
| 3 | 22 | 23 | 93 |
| 4 | 28 | 28 | 93 |
| 5 | 32 | 32 | 88 |
| 6 | 28 | 28 | 88 |
| 7 | 24 | 29 | 83 |
| 8 | 22 | 30 | 80 |
| 9 | 22 | 29 | 76 |

From the above, it will be readily apparent that the stabilized plates produced according to the process of the present invention (Sample C) had greatly improved stability values. In addition, the spread of the induction times, which depends to some extent upon the location of the given plate, is much smaller than the case with the other techniques (Samples A and B).

EXAMPLE 4

In this example, 4 samples of polyethylene were compared, as follows:
SAMPLE A

This sample corresponded to Sample A of Example 1.
SAMPLE B

This sample was stabilized by admixing in the roll. The stabilizers mentioned in Example 1 by prekneading for 5½ minutes to a temperature of 150°C and immediately thereafter and adding the stabilizers in a 10-minute kneading treatment.
SAMPLE C This sample was stabilized by adding the same stabilizers as mentioned in Example 1, by blending these with cold polyethylene and heating the mixture, with constant agitation, to 75°–80°C.
SAMPLE D This sample was stabilized according to the process of the present invention by adding the stabilizers as mentioned in Example 1, to polyethylene at a temperature of 75°–80°C, with constant agitation.

The oxyluminescence induction times of these samples were measured at a temperature of 170°C. The results of these measurements (averages of several experiments) are shown in table 4.

TABLE 4

|  | Samples | | | |
|---|---|---|---|---|
|  | A | B* | C | D |
| induction times at 170°C, hours | 0 | 4 | 5½ | 11 |

*measured on test plates.

This table 4 shows, again, that the process according to the invention (sample D) gives results that are superior to those obtained with the conventional blending techniques.

That the results obtained for the induction times are considerably lower than those given in table 2 is due to the fact that the measurements were made at a higher temperature.

What is claimed is:

1. A process for stabilizing at least one particulate thermoplastic organic polymer by admixing said polymer with at least one stabilizer for stabilizing said polymer against the effects of heat, light and/or oxygen, said stabilizer having a melting point at least 1°C less than the temperature at which the polymer agglomerates, decomposes or sinters, said stabilizer being in the non-liquid state, wherein said polymer is heated to a temperature at least 0.1°C higher than the melting point of said stabilizer and lower than the agglomeration, decomposition and/or sintering temperature of said polymer, and thereafter said polymer is admixed with from 0.001 to 10% by weight, based on the weight of said polymer, of said stabilizer while said polymer is at about said temperature, and while said stabilizer is at a temperature at least 1°C below the melting point thereof.

2. The process according to claim 1 wherein said stabilizer is admixed with said polymer in a fluidized bed.

3. The process according to claim 1, wherein said stabilizer is mixed with said polymer in a mixing drum.

4. The process according to claim 1, wherein the average smallest diameter of the polymer particles is less than 5 mm.

5. The process according to claim 1, wherein the polymer is in the form of fibers having a smallest dimension of less than 500 microns.

6. The process according to claim 1 wherein said thermoplastic organic polymer is one alkene polymer.

7. The process according to claim 1, wherein the thermoplastic organic polymer is a vinyl polymer.

8. The process according to claim 1 wherein the polymer has a temperature of 20°-200°C when mixed with said stabilizer.

9. Process according to claim 1 wherein the polymer is heated to a temperature of at most 100°C higher than the melting point of said stabilizer.

10. Process according to claim 9 wherein the polymer is heated to a temperature between 5° and 60°C higher than the melting point of said stabilizer.

11. Process according to claim 1 wherein at most 5% by weight of said stabilizer is used.

12. Stabilized polymers produced by the process of claim 1.

13. Process according to claim 1, wherein said stabilizer is selected from the group consisting of substituted phenols and substituted bis phenols wherein the phenolic ring is substituted by at least one radical selected from the group consisting of hydroxyl and alkyl of 1-6 carbon atoms.

14. Process according to claim 1, wherein said stabilizer is a hydroxy compound containing from 3-6 carbon atoms and from 3-6 hydroxyl groups.

15. Process according to claim 1, wherein said stabilizer is selected from the group consisting of phenolic ethers and bis phenolic ethers wherein the phenolic ring can be substituted with a member selected from the group consisting of hydroxyl, alkyl of 1-6 carbon atoms and benzylradicals, which in turn may be substituted by hydroxyl, alkoxy groups and alkyl groups of 1-6 carbon atoms.

16. Process according to claim 1, wherein said stabilizer is a carboxylic acid ester of aliphatic and aromatic acids containing from 6 to 20 carbon atoms wherein the ester radical is alkyl of 4-20 carbon atoms or phenyl which may be substituted by at least one hydroxyl or alkyl of 1-12 carbon atoms.

17. Process according to claim 1, wherein said stabilizer is selected from the group consisting of aromatic keto compounds and diketo compounds wherein the carbonyl carbon atoms carries two aryl radicals which may be substituted by at least one hydroxyl, halogen, carboxyl, alkyl of 1-6 carbon atoms or alkoxy of 1-10 carbon atoms.

18. Process according to claim 1, wherein said stabilizer is selected from the group consisting of aromatic secondary amines and diamines containing at least one phenyl or naphthyl substituent and at least one other nitrogen substitutent selected from the group consisting of phenyl, naphthyl and alkyl of 1-10 carbon atoms.

19. Process according to claim 1, wherein said stabilizer is an aryl phosphite, wherein the aryl ring may be substituted with hydroxyl or alkyl of 1-12 carbon atoms.

20. Process according to claim 1, wherein said stabilizer is selected from the group consisting of aromatic and aliphatic thio ethers and mercapto compounds, wherein the sulphur atom(s) carries at least one substituent selected from the group consisting of phenyl, substituted phenyl having at least one hydroxyl substituent or alkyl substituent of 1-6 carbon atoms, propionate, and alkyl of 1-20 carbon atoms.

* * * * *

UNITED STATES PATENT OFFICE
CERTIFICATE OF CORRECTION

Patent No. 3,880,803            Dated April 29, 1975

Inventor(s) Sietske Keizer

It is certified that error appears in the above-identified patent and that said Letters Patent are hereby corrected as shown below:

Column 7, line 51, please insert -- ) -- after 1969.

Column 7, line 53, please insert --), 53-57.-- after 1969.

Signed and Sealed this twenty-fourth Day of February 1976

[SEAL]

Attest:

RUTH C. MASON
*Attesting Officer*

C. MARSHALL DANN
*Commissioner of Patents and Trademarks*